United States Patent
Edgar

(10) Patent No.: US 7,270,338 B1
(45) Date of Patent: Sep. 18, 2007

(54) INSULATING COMPARTMENT FOR GROCERY CART

(76) Inventor: Steven L. Edgar, 5510 S. Stonegate, Springfield, MO (US) 65810

( * ) Notice: Subject to any disclaimer, the term of this patent is extended or adjusted under 35 U.S.C. 154(b) by 262 days.

(21) Appl. No.: 10/978,663

(22) Filed: Nov. 1, 2004

Related U.S. Application Data

(63) Continuation-in-part of application No. 10/369,185, filed on Feb. 15, 2003, now abandoned.

(60) Provisional application No. 60/357,229, filed on Feb. 16, 2002.

(51) Int. Cl.
B62B 3/14 (2006.01)
B62B 5/00 (2006.01)

(52) U.S. Cl. .................................. 280/33.992
(58) Field of Classification Search ........... 280/33.991, 280/33.992, 33.993; 206/545, 546; 220/592.03, 220/592.08
See application file for complete search history.

(56) References Cited

U.S. PATENT DOCUMENTS

| | | | |
|---|---|---|---|
| D156,702 S | 1/1950 | Concklin | D34/22 |
| 3,157,871 A | 11/1964 | Umanoff | 340/539.21 |
| 3,706,460 A * | 12/1972 | Thomas | 280/33.995 |
| 4,081,205 A | 3/1978 | Rosenacker | 312/249.8 |
| 4,375,828 A | 3/1983 | Biddison | 383/41 |
| 4,560,096 A | 12/1985 | Lucas et al. | 224/411 |
| 4,871,100 A | 10/1989 | Posner | 224/411 |
| 5,002,292 A | 3/1991 | Myers | 280/33.992 |
| 5,170,632 A | 12/1992 | Reilly, Jr. et al. | 62/77 |
| 5,306,033 A * | 4/1994 | Evans | 280/33.992 |
| 5,427,394 A | 6/1995 | Lauto | 280/47.35 |
| 5,435,582 A | 7/1995 | Davidson | 280/33.992 |
| 5,533,361 A | 7/1996 | Halpern | 62/457.2 |
| 5,649,718 A | 7/1997 | Groglio | 280/641 |
| 5,836,596 A * | 11/1998 | Wanzl | 280/33.991 |
| 5,947,313 A | 9/1999 | Kern et al. | 220/4.01 |
| 5,961,133 A * | 10/1999 | Perry | 280/33.993 |
| 5,992,664 A | 11/1999 | Trapp et al. | 220/6 |
| 6,336,342 B1 | 1/2002 | Zeddies | 62/457.2 |
| 6,565,102 B2 | 5/2003 | Buckley, III | 280/33.992 |
| 6,641,147 B2 | 11/2003 | Werner | 280/33.991 |
| 6,766,931 B2 * | 7/2004 | Wolf | 224/411 |

* cited by examiner

Primary Examiner—Christopher P. Ellis
Assistant Examiner—Bridget Avery
(74) Attorney, Agent, or Firm—Jonathan A. Bay

(57) ABSTRACT

An insulating compartment is combined with a type grocery cart characterized by an open basket having forwardly-tapering sidewalls and bottom wall which terminate in a common front wall, as well as having a top-hung rear flap-panel that swings up when the nose of a like grocery cart's basket pushes inside from the rear to enter and dock inside the basket space of the first grocery cart. The insulating compartment is limited in extent to generally the front portions only of the grocery cart's basket. Preferably, the insulating compartment comprises a front wall that matches flush against substantial portions of the basket's front wall. It also comprises abbreviated sidewalls and bottom wall arranged to match flush against front portions of the basket's sidewalls and bottom wall. Thus, the insulating compartment provides insulation service to cold or frozen food and beverage merchandise during grocery shopping trips.

20 Claims, 4 Drawing Sheets excess # INSULATING COMPARTMENT FOR GROCERY CART

CROSS-REFERENCE TO RELATED APPLICATION(S)

This application is a continuation-in-part of U.S. patent application Ser. No. 10/369,185, filed Feb. 15, 2003, now abandoned which claims the benefit of U.S. Provisional Application No. 60/357,229, filed Feb. 16, 2002, all of the foregoing disclosures of which are incorporated by this reference.

BACKGROUND AND OF THE INVENTION

The invention relates to grocery shopping carts and, more particularly, to an insulating compartment that lines an inside portion of a grocery cart's basket in order to provide insulation service for cold or frozen food and beverage merchandise during the duration a customer shops, checks out and leaves a grocery store.

A number of additional features and objects will be apparent in connection with the following discussion of preferred embodiments and examples.

SUMMARY OF THE INVENTION

It is an object of the invention to provide a grocery cart with an insulating compartment that lines the inside of a grocery cart's basket in part (ie., it lines part of, and not all, the inside of the grocery cart's basket).

It is an alternate object of the invention that the above insulating compartment provide insulation service to cold or frozen food and beverage merchandise during the time a customer shops, checks out and departs a grocery store. That way, the cold or frozen temperatures of such merchandise can be sustained or preserved for longer periods of time than in the absence of the invention.

It is another object of the invention that the above insulating compartment be formed with an abbreviated (ie., in the sense as shortened) bottom wall as well as an open back wall so as not to interfere with the upswing of the top-hung rear flap-panel of the grocery cart's basket. Briefly, such swing capability in the top-hung rear flap-panel of conventional grocery cart baskets allows one cart's basket to nose inside the basket space of another in order to form more compact trains. In other words, when the nose of a trailing grocery cart's basket is rammed into the rear flap-panel of a leading forward grocery cart, the leading cart's rear flap-panel swings up so that the trailing cart's basket's nose can push into and nest inside the basket space of the leading cart. Lengthy trains of grocery carts can be formed in such a procession of one cart after another nosed into the rearwardly-accessible basket space of the immediately preceding cart. Doing this forms more compact lines or trains of grocery carts during non-use and storage as well as mass maneuvering.

It is a further object of the invention that the above insulating compartment be formed with an open top or, in other words, without means of a lid or like closure. This is preferred so that store merchandise can be more readily deposited and/or withdrawn by either the customer and/or cash-register clerk.

These and other aspects and objects are provided by combining an insulating compartment with a given grocery cart of the type comprising an open basket defined by forwardly-tapering sidewalls spaced by a bottom wall and which all terminate in a front wall. The given grocery cart's basket is also as well defined by a top-hung rear flap-panel that swings up when the nose of a like grocery cart's basket pushes inside from the rear to enter and dock inside the basket space of said given grocery cart.

The insulating compartment is sized and arranged to be generally limited in extent to the front portions only of the given grocery cart's basket. That is, the insulating compartment comprises a front wall arranged to match flush against substantial portions of the given grocery cart's basket's front wall. It as well comprises abbreviated sidewalls and bottom wall arranged to match flush against front portions of the given grocery cart's basket's sidewalls and bottom wall. And so, the insulating compartment provides insulation service to cold or frozen food and beverage merchandise during the temporary time a customer shops a grocery store.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
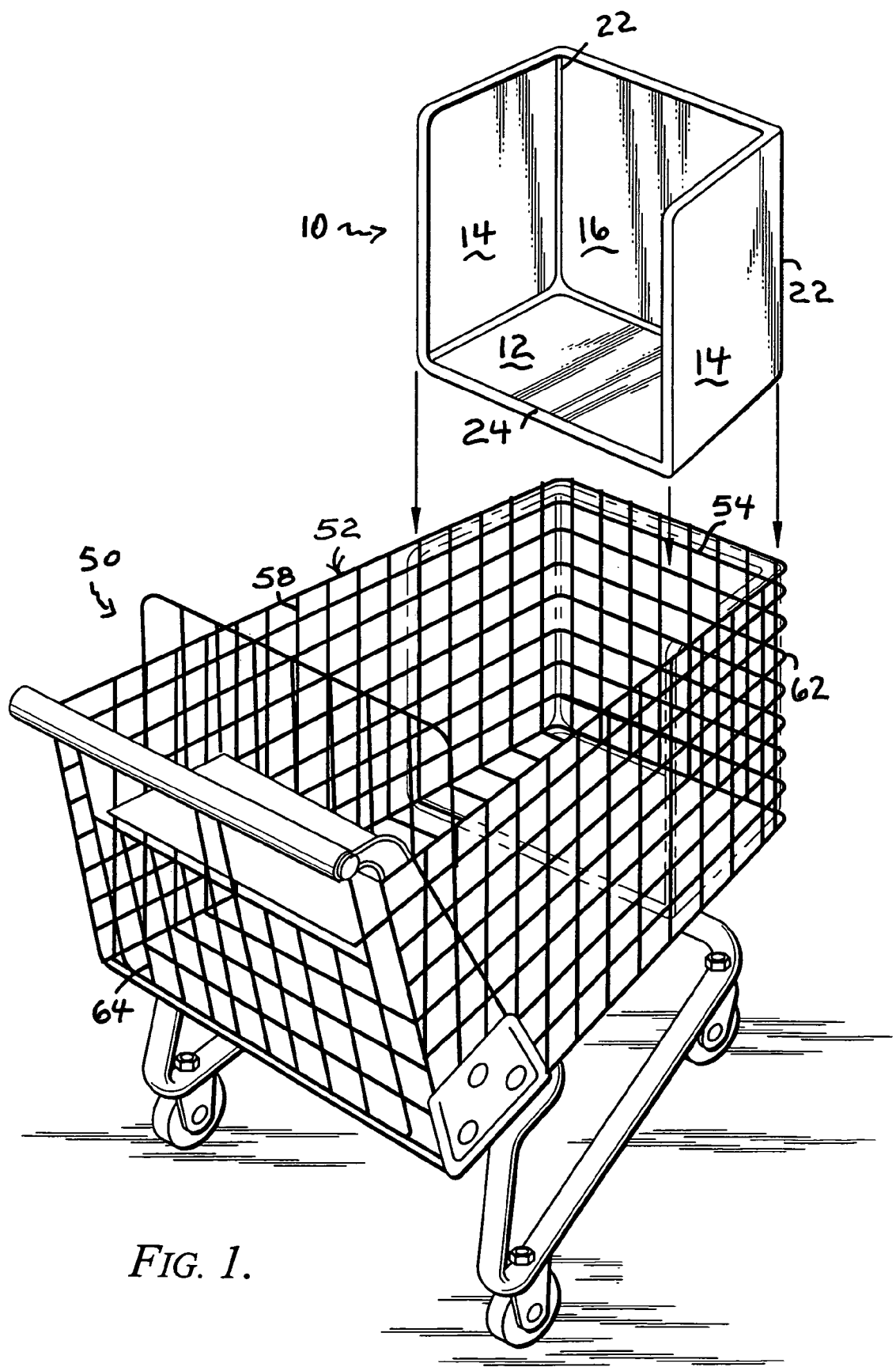
FIG. 1 is a fragmentary perspective view of an insulating compartment in accordance with the invention for combining with a conventional grocery shopping cart.

FIG. 1 is a perspective view of an insulating compartment 10 in accordance with the invention for combining with a conventional grocery shopping cart 50. The insulating compartment 10 is preferably produced from a water-resistant insulating material including without limitation styrene foam. That is, preferably the insulating compartment 10 is produced from a single material as shown. However, the insulating compartment 10 could alternatively be produced as a composite of insulating material and then other materials such as either rigid plastics or soft synthetics for the coating or covering layer and the like. It is an object of the invention that the insulating compartment 10's walls possess insulating capabilities concurrently with surface finishes which afford easy to wipe-clean convenience.

As shown by FIG. 1, the insulating compartment 10 has a bottom wall 12, left and right sidewalls 14 and a front wall 16. Absent from the insulating compartment 10 is a full back wall and/or full top wall as well. Indeed in the preferred embodiment the insulating compartment 10 has neither back wall nor top wall whatsoever, not even rudimentary ones. Although, when the reasons for the absent top and rear wall are more particularly described below, the objects of the invention could be achieved nevertheless if rudimentary top or rear walls were included (none shown). The insulating compartment 10 can be produced as a molded product or alternatively constructed from four (4) pieces of generally planar stock material bonded together in the shape shown.

The grocery cart 50 illustrated in FIG. 1 is representative of conventional grocery carts in general. This particular grocery cart 50 has a basket 52 of wireframe construction although other popular varieties have molded plastic baskets perforated with apertures in the fashion of grillwork resembling wireframe construction. It is conventional and highly preferred to ventilate grocery shopping carts in order that they not become rainwater or snow catching buckets when stored or temporarily parked/idled outdoors during weather. The inventive insulating compartment 10 is producible in various sizes and shapes in order to get it to match all sorts of conventional popular grocery cart styles. Hence the particular grocery-cart style shown by the drawings represents a single example for convenience in this description but otherwise does not limit the invention to combining with that one style alone. Persons having ordinary skill in the art would be able to routinely match the dimensions of the insulating compartment 10 to about any particular conventional grocery-cart style and thus still be proceeding in accordance with teachings of this disclosure.

Figure 2:
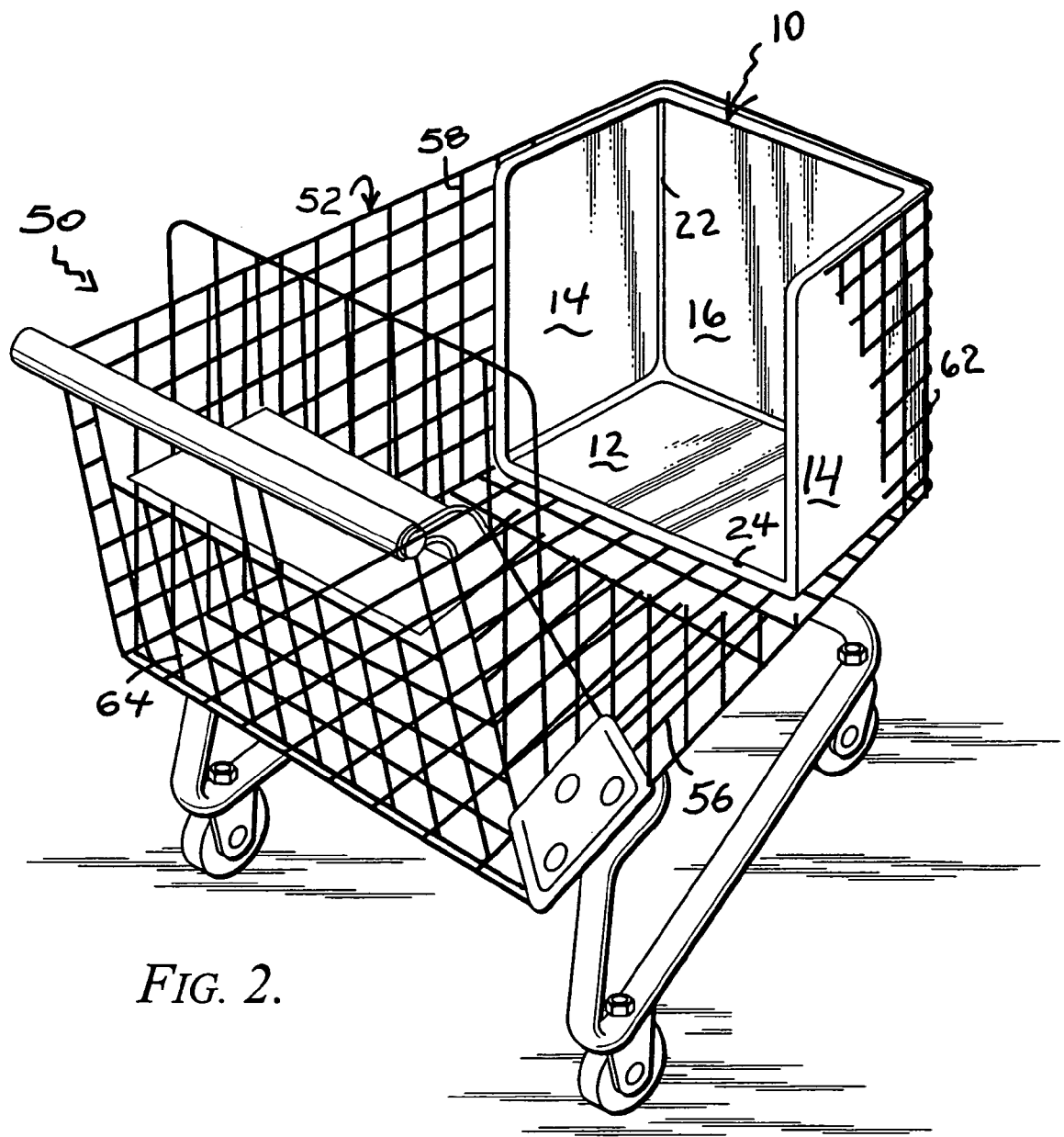
FIG. 2 is a perspective view comparable to FIG. 1 except illustrating the insulating compartment nested as shown in the basket of the grocery cart, wherein parts of the basket's wireframe sidewall is removed from view for illustrative purposes only.

FIG. 2 shows the insulating compartment 10 installed in the front part of the grocery cart 50's basket 52. Preferably the insulating compartment 10 closely lines the inside of the basket 52's front margin as shown. More particularly, the insulating compartment 10's front and bottom walls 16 and 12 line the inside of the grocery cart basket 52's front wall 54 and front margin of a bottom wall 56 as shown. Likewise the insulating compartment 10's sidewalls 14 mate with the interior front margins of the basket 52's wireframe sidewalls 58 as shown, and in a fashion as spread flat up against them. Preferably the insulating compartment 10 is sized and shaped such that its front left and right vertical seams 22 wedge tightly in the grocery cart basket 52's front left and right vertical corners 62. The advantage of such wedging action is that the wedge fit provides retention of the insulating compartment 10 without use of any other positive fastening. That way, the insulating compartment 10 is in a general sense permanently installed in the grocery cart 50 basket without fasteners or the like. Yet at the end of its use life—say after the inventive insulating compartment 10 wears thin or becomes too soiled—one such insulating compartment 10 can be replaced with a fresh replacement (fresh replacement not shown by the drawings).

Figure 3:
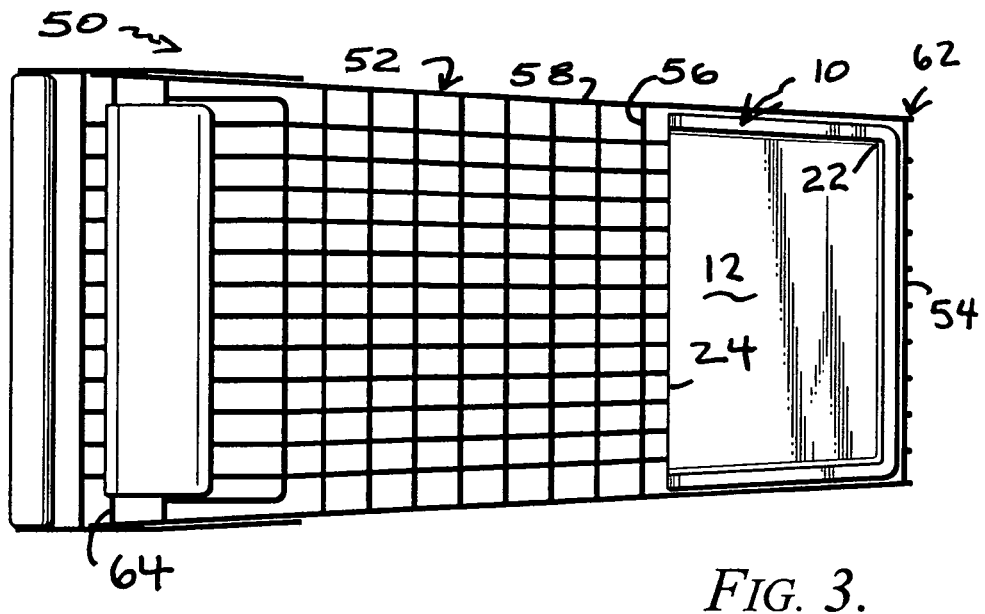
FIG. 3 is a reduced scale top plan view of FIG. 2.

To turn to FIG. 3, it shows the insulating compartment 10's tight fit in the front corners 62 of the basket 52. As mentioned above, preferably the insulating compartment 10 is especially sized to achieve the desired amount of wedging which holds the insulating compartment 10 relatively tight in position.

Figure 4:
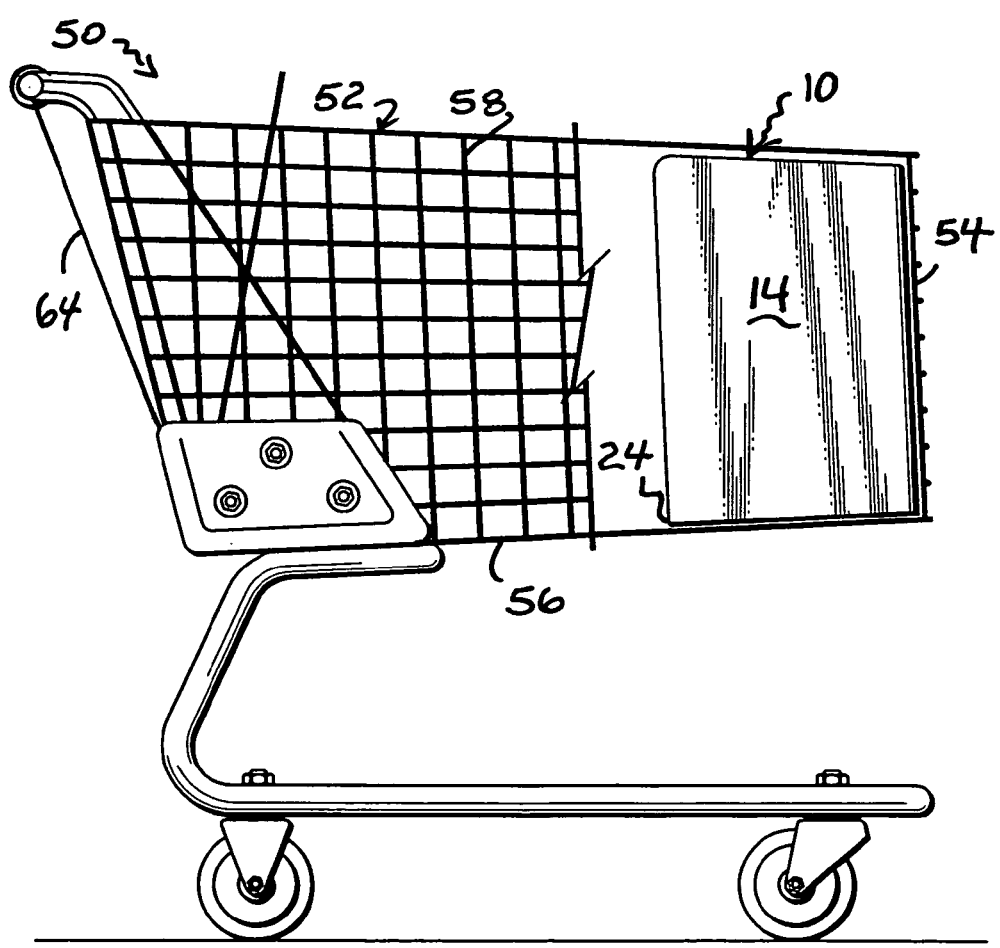
FIG. 4 is a lateral side view thereof.
Figure 5:
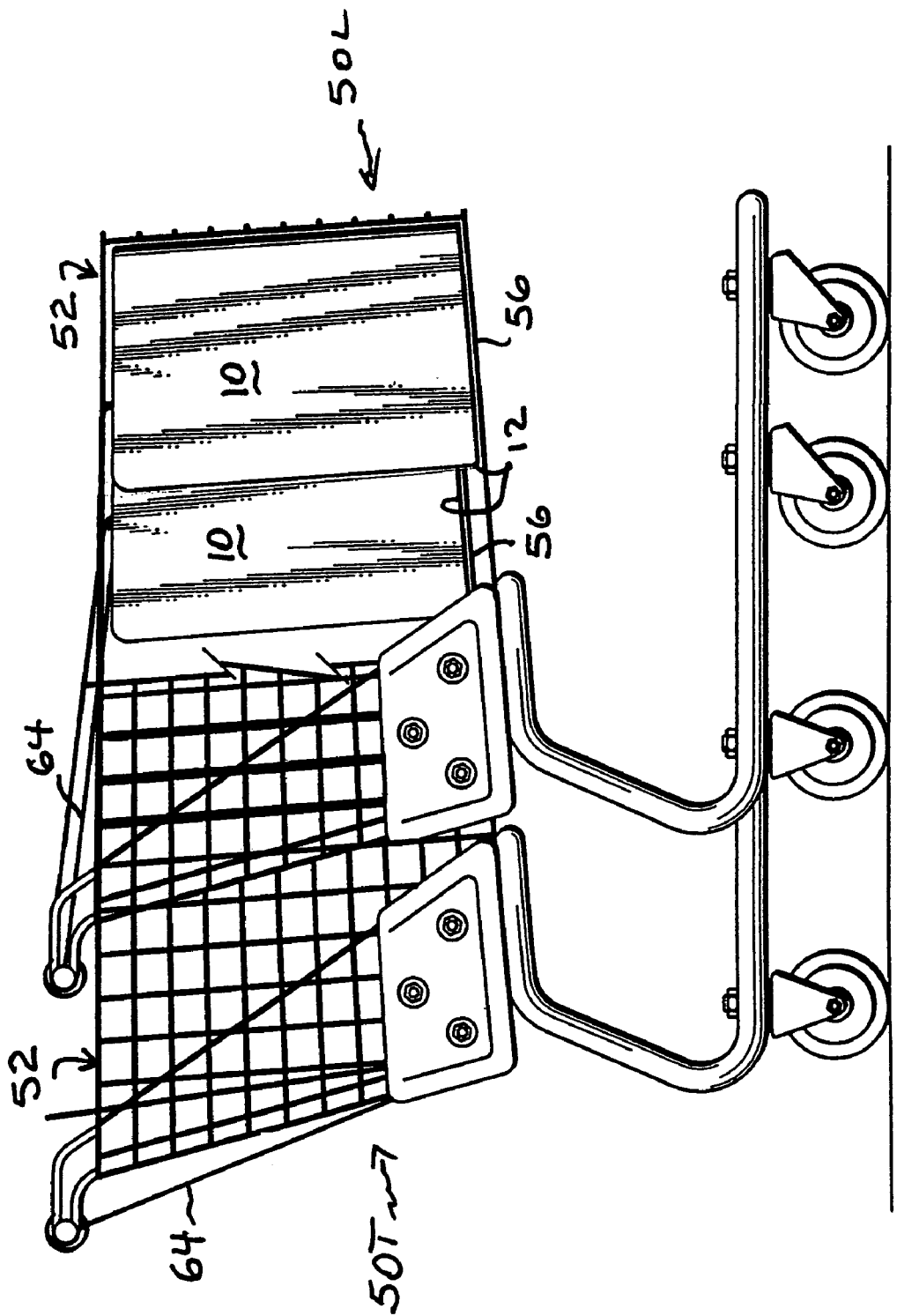
FIG. 5 is a lateral side view comparable to FIG. 4 except showing a train comprising two like grocery shopping carts, a relatively trailing one having the nose of its basket docked inside of through the rear frame of the basket of the relatively leading grocery shopping cart, wherein each of the grocery shopping carts are outfitted with an insulating compartment in accordance with the invention.

FIGS. 3 and 4 show better that the bottom wall 12 of the insulating compartment 10 is relatively abbreviated. That is, this bottom wall 12 extends only part way back from the front 54 of the grocery cart basket 52 to terminate in a rear edge 24 at some intermediate point on the grocery cart basket 52's bottom wall 56. In connection with the foregoing, a related design choice with the insulating compartment 10 is the omission of a back wall. Pause can be taken to consider a conventional feature of conventional grocery carts. That is, grocery cart baskets 52 are conventionally provided with a top-hung rear flap-panel 64 at the rear of the basket 52 which swings up if pushed inside. FIG. 5 shows two such carts in a train. Whereas FIG. 5 shows a train of just two carts, it is well known that trains of carts 50 can be readily formed in an indefinite length comprising an indefinite number of carts 50. Such upswing action with top-hung rear flap-panels 64 allows the nose of a relatively trailing grocery cart 50T to dock forward inside a basket of a relatively leading grocery cart 50L. Hence the basket nose of the relatively trailing grocery cart 50T penetrates into the basket interior of the relatively leading grocery cart 50L. To enable this, the relatively leading grocery cart 50L (indeed, likewise with the relatively trailing grocery cart 50T because in another instance it may be the relatively leading cart) is provided with such a swinging top-hung rear flap-panel 64 as indicated in the drawings. The nose of the relatively trailing grocery cart 50T causes this top-hung rear flap-panel 64 to swing up in order to admit the entry and docking of the relatively trailing grocery cart's nose. Therefore, large numbers of like grocery carts can be formed into compact trains (or the like, eg., queues, lines, barge rafts) having the basket of one grocery cart nesting compactly into basket space of a preceding grocery cart, and so on indefinitely. Such trains of grocery carts can be formed up thereby in relatively compact queues during non-use and storage, as well as for mass maneuvers such as when baggers are sent out to the parking lots to retrieve the empty ones.

Typically such swinging top-hung rear flap-panels 64 are trapezoidal, having parallel top and bottom edges extending on horizontal axes spaced by side edges which taper toward each other in the direction from top to bottom. Generally, the rear flap-panel 64's bottom edge is sized short to allow it clearance between the basket 52's sidewalls 58 because the sidewalls 58 taper toward each other in the direction from rear to front. That is, further features of grocery carts that allow such docking include the basket 52 being tapered such that its sidewalls 58 are gapped more narrowly at the nose than at the rear flap-panel 64, where the sidewalls 58 are gapped more broadly. Additionally, the bottom wall 56 of a grocery cart (eg., consider bottom wall 56 of trailing cart 50T in FIG. 5) is also inclined upwardly in the forwards direction so that it too can dock above the bottom wall 56 of a relatively leading grocery cart (eg., 50L in FIG. 5, and as illustrated). Also, the grocery cart's wheels are attached on a square-U shaped wheelbase whose legs flare outwardly in the rearward direction. Similarly, the grocery cart basket 52's upper rim (or, ie., at least that much which forms the upper terminuses of those of the front and sidewalls 54 and 58) likewise has a square-U shape which flares outwardly in the rearward direction.

Given the foregoing, the insulating compartment 10 is therefore formed with such an abbreviated bottom wall 12 and absent back wall so as not to interfere with the upswing (and return downswing) of the top-hung rear flap-panel 64. Such a conventional grocery cart 50 as shown can be equipped with the insulating compartment 10 in accordance with the invention without any detrimental effect on a relatively leading grocery cart 50L's ability to fully receive a docking or penetrating (relatively) trailing grocery cart 50T. Hence compact trains of forward docking grocery carts can be formed just the same whether the insulating compartment 10 is incorporated or not. The size and shape of the insulating compartment 10 is preferably scaled to avoid all interference with the docking or queue-forming ability of like grocery carts. Presumptively, the relative choice of where to terminate the insulating compartment 10's bottom wall 12 is a design factor dependent on the particulars of a given style of grocery cart. The drawings provide one non-limiting example of where to terminate one given abbreviated bottom wall 12 for the insulating compartment 10 in accordance with the invention.

Returning to FIG. 5, it shows that the insulating compartments 10's bottom walls 12 are sloped to match and be flush with the grocery carts sloping bottom walls 52. Not only does this assist the work of providing for a snug fit and retention of the insulating compartment 10 in the front margins of the baskets 52 but the sloping bottom walls 12 also facilitate run-off or drainage of rainwater or snow-melt during or after times when the grocery carts are parked outside on outdoor parking lots.

Additionally, the insulating compartments 10's sloping bottom walls 12 allows clearance for the bottom wall 56 of a trailing cart 50T's basket 52 when the trailing cart 50T's basket 52 is docked in the basket space 52 of a leading cart 50L. That is, the sloping bottom wall 12 of the insulating compartment 10 in the leading cart 50L does not impede or interfere with the docking of the trailing cart 50T. Likewise, the insulating compartments 10's forwardly tapering sidewalls 14 allow clearance for the sidewalls 58 of a trailing cart 50T's basket 52 when the trailing cart 50T's basket 52 is docked in the basket space 52 of a leading cart 50L. Again, the reason for this is to avoid impeding or interfering with the docking of the trailing cart 50T.

Generally, given the docking of a trailing cart 50T in a leading cart 50L, the limit of forward docking by the trailing cart 50T in the leading cart 50L is conventionally limited by interferences or stops associated wherein one cart's legs, wheelbase or lower frame collides against the legs, lower frame or wheelbase of the other cart.

It is a further aspect of the invention that the insulating compartment 10 is formed with an open top. In other words, absent from the insulating compartment 10 is any lid or like closure. That way, both the customer (ie., the shopper who fills the cart while shopping) and the cash register clerk (who empties the cart while ringing up the merchandise) can reach in easily and deposit or withdraw items to or from the insulating compartment 10. The provision of a lid or closure would likely result in annoyance or interference with the reach in of either customers or grocery store employees. Also, there is little worthy benefit to be gained by any lid because cold air sinks, and thus the lid would certainly not be needed to contain a rising plume because none is expected. A lid might offer a minor benefit in shielding out ambient thermal radiation or reducing turbulent mixing while the cart is being pushed about. Nevertheless, those minor benefits are arguably outweighed by various annoyance factors in contemplation of inclusion of a lid such as:—how to movably secure a lid to prevent its loss, and then how to fashion a movable securing means for the lid that is not easily broken during rough use or is not generally inconveniencing either the customer of grocery store employees when accessing merchandise in the insulating compartment 10, and so on. Therefore in view of the objects of the invention, the balance of the foregoing factors tips in favor of omitting a lid or the like.

Among other views, FIG. 4 shows that the height of the insulating compartment 10 is designed to be level with or slightly lower than the rim of the basket 52. This again is preferred in order to avoid interfering with one grocery cart basket 52 from nesting and/or docking cleanly inside the basket 52 of a preceding grocery cart 50 (this is not shown) even if equipped with the insulating compartment 10 in accordance with the invention.

In use, the insulating compartment 10 provides insulation service to cold or frozen food and beverage merchandise while transported in the grocery cart 50. The insulating compartment 10 better preserves or sustains the cold or frozen temperatures of such merchandise for longer periods of time than in the absence of the invention. Customers can idle more lazily while grocery shopping and be freer from concern over the degradation of temperature with such cold or frozen merchandise. Customers are relieved from the urgency to wait until last to pick up the most delicate cold or frozen merchandise because the insulating compartment 10 lengthens the time such merchandise can persist without known or detectable degradation. Also, the front and sidewalls 16 and 14 function as windbreaks during travel with the grocery cart 50.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An insulating compartment for a given grocery cart having an open-topped basket comprising forwardly-tapering sidewalls spaced by a forwardly-upsloping bottom wall and which all terminate in a front wall as well as comprising a top-hung rear flap-panel which swings up when the nose of a like, trailing grocery cart's basket pushes inside from the rear to enter and dock inside the basket space of said given grocery cart such that the nose of said trailing grocery cart penetrates to a forward limit relative the bottom and sidewalls of said given grocery cart, said insulating compartment comprising:

an insulating insert for the given grocery cart's basket which is sized and arranged for occupying a front margin of the basket thereof and which comprises a front wall to match flush against substantial portions of the inside of the given grocery cart's basket's front wall, and having abbreviated rearwardly-flaring sidewalls and rearwardly-downsloping bottom wall which terminate in respective rear edges that are rearward of said forward limit of the nose of a docking trailing grocery cart's basket, and which match flush against front margins of the given grocery cart's basket's sidewalls and bottom wall, said insulating insert defining a compartment space bounded by the bottom wall, front wall, two sidewalls thereof as well as a vertical plane containing the respective rear edges of said bottom and side walls thereof whereby said compartment space provides insulation service to cold or frozen food and beverage merchandise during the duration of a customer's shopping trip at a grocery store;

wherein absent from said insulating insert is any rear wall, not even a rudimentary one nor else any other means of interference along the bottom wall's rear edge so as to:

exclude interference with the run-off or drainage of rainwater, snow-melt and/or soaked debris associated therewith during or times when said given grocery cart is parked outside as on a grocery store's outdoor parking lot, afford easy to wipe-clean convenience to the insulating insert's bottom wall to clean away any residue of rainwater, snow-melt as well as the soaked debris associated therewith after times when said given grocery cart experiences such, and facilitate any trailing grocery cart's nose to penetrate into said insulating insert's compartment space when entering from the rear through said vertical plane containing the respective rear wedges of said bottom and side walls thereof and thereby not impede compact docking between said given and trailing grocery carts.

2. The insulating compartment of claim 1, wherein absent from said insulating insert is any top wall, lid or means for providing closure thereto so that store merchandise can more accessibly without interference be deposited and/or withdrawn by either the customer and/or grocery store employees including cash-register clerks.

3. The insulating compartment of claim 1, wherein said insulating insert is produced from moldable materials and is a product of a single-piece molding.

4. The insulating compartment of claim 1, wherein the insulating insert is produced from water-resistant insulating material to better facilitate easy to wipe-clean convenience of the insulating insert of any residue of rainwater, snow-melt as well as the soaked debris associated therewith after times when said given grocery cart experiences such.

5. The insulating compartment of claim 1, wherein the height of the insulating insert is sized and arranged to be level with or slightly lower than a rim of the grocery cart's basket.

6. The insulating compartment of claim 3, wherein said insulating insert's bottom and side walls are arranged to spread flat against the counterpart interior front margins of the given grocery cart's basket's bottom and side walls, said insulating insert's front wall meeting the flanking sidewalls thereof in front left and right vertical seams;

said front left and right vertical seams being spaced and sized to wedge tightly in the given grocery cart basket's front left and right vertical corners and thereby provide retention of the insulating insert without use of any other positive fastening.

7. The insulating compartment of claim 4, wherein said water-resistant insulating material comprises styrene foam.

8. An insulating compartment for a grocery cart having an open basket comprising forwardly-tapering sidewalls spaced by a forwardly-upsloping bottom wall and which all terminate in a front wall as well as comprising a top-hung rear flap-panel which swings up when the nose of a like grocery cart's basket pushes inside from the rear to enter and dock inside the basket space of said grocery cart, said insulating compartment comprising:

an insulating insert for the grocery cart's basket which is sized and arranged for occupying a front margin of the basket and which comprises a front wall to match flush against substantial portions of the inside of the basket's front wall, and having abbreviated rearwardly-flaring sidewalls and rearwardly-downsloping bottom wall which terminate in respective rear edges and which match flush against front margins of the basket's sidewalls and bottom wall, whereby said insulating insert provides insulation service to cold or frozen food and beverage merchandise during the duration of a customer's shopping trip at a grocery;

wherein absent from said insulating insert is any rear wall, not even a rudimentary one nor else any other means of interference along the bottom wall's rear edge so as to:

exclude interference with the run-off or drainage of rainwater, snow-melt and/or soaked debris associated therewith during or times when said grocery cart is parked outside as on a grocery store's outdoor parking lot, and/or afford easy to wipe-clean convenience to the insulating insert's bottom wall to clean away any residue of rainwater, snow-melt as well as the soaked debris associated therewith after times when said grocery cart experiences such.

9. The insulating compartment of claim 8 being sized and arranged such that it fits inside the front margin of the grocery cart's basket to achieve a wedge fit that provides retention of the insulating insert without use of any other positive fastening or fasteners.

10. The insulating compartment of claim 8, wherein absent from said insulating insert is any top wall, lid or means for providing closure thereto so that store merchandise can more accessibly without interference be deposited and/or withdrawn by either the customer and/or grocery store employees including cash-register clerks.

11. The insulating compartment of claim 8, wherein said insulating insert is produced from moldable materials and is a product of a single-piece molding.

12. The insulating compartment of claim 8, wherein the insulating insert is produced from water-resistant insulating material.

13. The insulating compartment of claim 8, wherein the height of the insulating insert is sized and arranged to be level with or slightly lower than a rim of the grocery cart's basket.

14. The insulating compartment of claim 12, wherein said insulating insert's bottom and side walls are arranged to spread flat against the counterpart interior front margins of the grocery cart's basket's bottom and side walls, said insulating insert's front wall meeting the flanking sidewalls thereof in front left and right vertical seams;

said front left and right vertical seams being spaced and sized to wedge tightly in the grocery cart basket's front left and right vertical corners and thereby provide retention of the insulating insert without use of any other positive fastening.

15. A combination insulating compartment and grocery cart comprising:

a grocery cart having an open basket defined by forwardly-tapering sidewalls spaced by a bottom wall and which all terminate in a front wall as well as defined by a top-hung rear flap-panel which swings up when the nose of a like grocery cart's basket pushes inside from the rear to enter and dock inside the basket space of said grocery cart; and said insulating compartment, which is sized and arranged for occupying a front margin of the basket and which comprises a front wall to match flush against substantial portions of the inside of the basket's front wall, and having abbreviated rearwardly-flaring sidewalls and rearwardly-downsloping bottom wall which terminate in respective rear edges and which match flush against front margins of the basket's sidewalls and bottom wall, whereby said insulating compartment provides insulation service to cold or frozen food and beverage merchandise during the duration of a customer's shopping trip at a grocery:

wherein absent from said insulating compartment is any rear wall, not even a rudimentary one nor else any other means of interference along the bottom wall's rear edge so as to:

exclude interference with the run-off or drainage of rainwater, snow-melt and/or soaked debris associated therewith during or times when said grocery cart is parked outside as on a grocery store's outdoor parking lot, and/or afford easy to wipe-clean convenience to the insulating compartment's bottom wall to clean away any residue of rainwater, snow-melt as well as the soaked debris associated therewith after times when said grocery cart experiences such.

16. The insulating compartment of claim 15 being sized and arranged such that it fits inside a front portion of the grocery cart's basket to achieve a wedge fit that provides retention of the insulating compartment without use of any other positive fastening or fasteners.

17. The insulating compartment of claim 15, wherein said insulating compartment's bottom and side walls are arranged to spread flat against the counterpart interior front margins of the grocery cart's basket's bottom and side walls, said insulating compartment's front wall meeting the flanking sidewalls thereof in front left and right vertical seams;

said front left and right vertical seams being spaced and sized to wedge tightly in the grocery cart basket's front left and right vertical corners and thereby provide retention of the insulating compartment without use of any other positive fastening.

18. The insulating compartment of claim 15, wherein absent from said insulating compartment is any top wall, lid or means for providing closure thereto so that store merchandise can more accessibly without interference be deposited and/or withdrawn by either the customer and/or grocery store employees including cash-register clerks.

19. The insulating compartment of claim 15, wherein the insulating compartment is produced from water-resistant insulating material to better facilitate easy to wipe-clean convenience of the insulating insert of any residue of rainwater, snow-melt as well as the soaked debris associated therewith after times when said grocery cart experiences such.

20. The insulating compartment of claim 15, wherein the height of the insulating compartment is sized and arranged to be level with or slightly lower than a rim of the grocery cart's basket.

* * * * *